(12) United States Patent  (10) Patent No.: US 12,183,078 B2
Valencia  (45) Date of Patent: Dec. 31, 2024

(54) OBJECT RECOGNITION (71) Applicant: COMMONWEALTH SCIENTIFIC AND INDUSTRIAL RESEARCH ORGANISATION, Acton (AU)

(72) Inventor: Phillip Valencia, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 0 days.

(21) Appl. No.: 18/692,516

(22) PCT Filed: Nov. 4, 2022

(86) PCT No.: PCT/AU2022/051322
§ 371 (c)(1),
(2) Date: Mar. 15, 2024

(87) PCT Pub. No.: WO2023/077193
PCT Pub. Date: May 11, 2023

(65) Prior Publication Data
US 2024/0265702 A1 Aug. 8, 2024

(30) Foreign Application Priority Data
Nov. 4, 2021 (AU) ................ 2021903529

(51) Int. Cl.
G06V 20/50 (2022.01)
G06V 10/82 (2022.01)

(52) U.S. Cl.
CPC ............ G06V 20/50 (2022.01); G06V 10/82 (2022.01)

(58) Field of Classification Search
CPC .................. G06V 20/50; G06V 10/82
See application file for complete search history.

(56) References Cited

U.S. PATENT DOCUMENTS 9,583,074 B2 * 2/2017 Chau .............. G01C 21/3673
10,049,307 B2 8/2018 Pankanti et al.
(Continued)

FOREIGN PATENT DOCUMENTS

JP  2020052484 A  4/2020
KR  20200036678 A  4/2020

OTHER PUBLICATIONS

Tatschke, Thomas. "Early sensor data fusion techniques for collision mitigation purposes." 2006 IEEE Intelligent Vehicles Symposium. IEEE, 2006. (Year: 2006).*

(Continued)

Primary Examiner — Utpal D Shah
(74) Attorney, Agent, or Firm — Merchant & Gould P.C.

(57) ABSTRACT

The present invention provides an object recognition system for recognising objects within an environment, including: tags, each tag being associated with a respective object, each tag including: a tag memory to store an object model being a computational model indicative of a relationship between the respective object and a shape encoding layer; a sensing system including: a sensing device to sense the environment; a sensing system memory to store a sensing device model being a computational model indicative of a relationship between sensor data captured using the sensing device and the shape encoding layer; sensing system processing devices to: receive object models from a transceiver; retrieve the sensing device model from the sensing system memory; acquire sensor data indicative of the environment from the sensing device; and analyse the sensor data using the sensing device model and the object models to thereby recognise the objects within the environment.

10 Claims, 4 Drawing Sheets (56) References Cited

U.S. PATENT DOCUMENTS

| | | | | |
|---|---|---|---|---|
| 10,706,321 | B1* | 7/2020 | Chen | G06T 3/4007 |
| 11,440,189 | B2* | 9/2022 | Lee | B25J 9/1666 |
| 11,694,356 | B2* | 7/2023 | Goforth | B60W 60/0027 |
| | | | | 701/26 |
| 2017/0083772 | A1 | 3/2017 | Kim et al. | |
| 2019/0141467 | A1 | 5/2019 | Breed | |
| 2019/0213438 | A1* | 7/2019 | Jones | G06V 40/10 |
| 2020/0202091 | A1* | 6/2020 | Wilfred | G06K 7/1096 |
| 2021/0158937 | A1* | 5/2021 | Wu | G06V 10/7796 |
| 2021/0370511 | A1 | 12/2021 | Hong | |
| 2022/0048080 | A1* | 2/2022 | Luong | B25J 9/1664 |
| 2023/0021676 | A1* | 1/2023 | Sreejith | G06V 10/764 |
| 2023/0186640 | A1* | 6/2023 | Kocamaz | G06V 10/225 |
| | | | | 382/104 |
| 2023/0230343 | A1* | 7/2023 | Xu | G06V 10/82 |
| | | | | 382/195 |

OTHER PUBLICATIONS

Ikeuchi, Katsushi, and Takeo Kanade. "Applying Sensor Models to Automatic Generation of Object Recognition Programs." ICCV. vol. 88. 1988. (Year: 1988).*

International Search Report and Written Opinion of the International Searching Authority for International Patent Application No. PCT/AU2022/051322 mailed on Jan. 16, 2023 (29 pages).

First Office Action issued on May 24, 2023 for Australian Application No. 202234886 (5 pages).

Second Office Action issued on Aug. 25, 2023 for Australian Application No. 202234886 (4 pages).

Heetika Gada, et al. "Object Recognition for the Visually Impaired", 2019 International Conference on Nascent Technologies in Engineering (ICNTE 2019), 5 pages.

* cited by examiner

OBJECT RECOGNITION

CROSS-REFERENCE TO RELATED APPLICATIONS

This application is a National Stage Application of PCT/AU2022/051322, filed on 4 Nov. 2022, which claims the benefit of application No. 2021903529, filed on 4 Nov. 2021 in Australia, and which applications are hereby incorporated by reference in their entireties. To the extent appropriate, a claim of priority is made to each of the above disclosed applications.

BACKGROUND OF THE INVENTION

The present invention relates to a system and method for recognising objects, and in one particular example, to a system and method for recognising objects using machine learning models.

DESCRIPTION OF THE PRIOR ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

The process of using machine learning to recognise objects is known. Traditional approaches fall into one of two broad categories, namely generating specific models for recognising individual objects, and generalised models for recognising multiple different objects. Models for recognising specific individual objects tend to be robust and perform well, but suffer from a lack of generality, whereas generalised models can recognise multiple objects, but tend to perform poorly. Additionally, irrespective of the type of model used, these tend to be specific to the sensing modality used to train the model, meaning it is necessary to have multiple different models to recognise the same object using different sensing modalities.

SUMMARY OF THE PRESENT INVENTION

In one broad form, an aspect of the present invention seeks to provide an object recognition system for recognising one or more objects within an environment, the system including: one or more tags, each tag being associated with a respective object in use, and each tag including: a tag memory configured to store an object model, the object model being a computational model indicative of a relationship between the respective object and a shape encoding layer: a tag transceiver; and, a tag processing device configured to cause the tag transceiver to transmit the object model: a sensing system including: a sensing device configured to sense the environment: a sensing system memory configured to store a sensing device model, the sensing device model being a computational model indicative of a relationship between sensor data captured using the sensing device and the shape encoding layer: a sensing system transceiver: one or more sensing system processing devices configured to: receive one or more object models from the transceiver: retrieve the sensing device model from the sensing system memory: acquire sensor data indicative of the environment from the sensing device; and, analyse the sensor data using the sensing device model and the one or more object models to thereby recognise the one or more objects within the environment.

In one embodiment the environment includes a plurality of objects, each being associated with a respective tag, and wherein the one or more processing devices are configured to recognise different ones of the plurality of objects.

In one embodiment each object model is one of: specific to a particular object; and, specific to a particular object type.

In one embodiment the one or more processing devices are configured to: use the sensor data and the sensing device model to generate shape encoding parameters; and, use the shape encoding parameters and the object model to recognise an object.

In one embodiment the tag processing device is configured to cause the tag transceiver to transmit the object model at least one of: periodically; and, in response to a model request message received by the tag transceiver.

In one embodiment the sensing device model is one of: specific to a particular sensing device; and, specific to a particular sensing device type.

In one embodiment the sensing device includes at least one of: an imaging device: a lidar; a radar; and, an acoustic mapping device.

In one embodiment the object model is at least one of: a generative adversarial neural network: a neural network; and, a recursive neural network.

In one embodiment the sensing device model is at least one of: a generative adversarial neural network: a neural network; and, a recursive neural network.

In one broad form, an aspect of the present invention seeks to provide an object recognition method for recognising one or more objects within an environment, the system including: one or more tags, each tag being associated with a respective object in use, and each tag including: a tag memory configured to store an object model, the object model being a computational model indicative of a relationship between the respective object and a shape encoding layer; a tag transceiver; and, a tag processing device configured to cause the tag transceiver to transmit the object model; a sensing system including: a sensing device configured to sense the environment; a sensing system memory configured to store a sensing device model, the sensing device model being a computational model indicative of a relationship between sensor data captured using the sensing device and the shape encoding layer; a sensing system transceiver; one or more processing devices configured to: receive one or more object models from the transceiver; retrieve the sensing device model from the sensing system memory; acquire sensor data indicative of the environment from the sensing device; and, analyse the sensor data using the sensing device model and the one or more object models to thereby recognise the one or more objects within the environment. A system for generating models for use in recognising a respective object within an environment, the system including one or more processing devices configured to: acquire sensor data indicative of the respective object within the environment from a sensing device; and, use the sensor data to: generate an object model indicative of a relationship between the respective object and a shape encoding layer; and, generate a sensing device model indicative of a relationship between sensor data captured using the sensing device and the shape encoding layer.

In one embodiment the one or more processing devices are configured to: acquire sensor data indicative of the respective object within the environment from multiple different sensing devices; and, use the sensor data to at least one of: generate the object model; and, generate multiple sensing device models.

In one embodiment the one or more processing devices are configured to: acquire sensor data indicative of multiple different objects within the environment; and, use the sensor data to at least one of: generate multiple object models, including a respective object model for each different object; and, generate a sensing device model.

In one embodiment each object model is one of: specific to a particular object; and, specific to a particular object type.

In one embodiment the sensing device model is one of: specific to a particular sensing device; and, specific to a particular sensing device type.

In one embodiment the object model is at least one of: a generative adversarial neural network; a neural network; and, a recursive neural network.

In one embodiment the sensing device model is at least one of: a generative adversarial neural network; a neural network; and, a recursive neural network.

In one broad form, an aspect of the present invention seeks to provide a system for generating models for use in recognising a respective object within an environment, the system including one or more processing devices configured to: acquire sensor data indicative of the respective object within the environment from a sensing device; and, use the sensor data to: generate an object model indicative of a relationship between the respective object and a shape encoding layer; and, generate a sensing device model indicative of a relationship between sensor data captured using the sensing device and the shape encoding layer.

In one broad form, an aspect of the present invention seeks to provide a method for generating models for use in recognising a respective object within an environment, the method including, in one or more processing devices: acquiring sensor data indicative of the respective object within the environment from a sensing device; and, using the sensor data to: generate an object model indicative of a relationship between the respective object and a shape encoding layer; and, generate a sensing device model indicative of a relationship between sensor data captured using the sensing device and the shape encoding layer.

In one broad form, an aspect of the present invention seeks to provide a computer program product for generating models for use in recognising a respective object within an environment, the computer program product including computer executable code, which when executed by one or more suitably programmed processing devices, causes the one or more processing devices to: acquire sensor data indicative of the respective object within the environment from a sensing device; and, use the sensor data to: generate an object model indicative of a relationship between the respective object and a shape encoding layer; and, generate a sensing device model indicative of a relationship between sensor data captured using the sensing device and the shape encoding layer.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
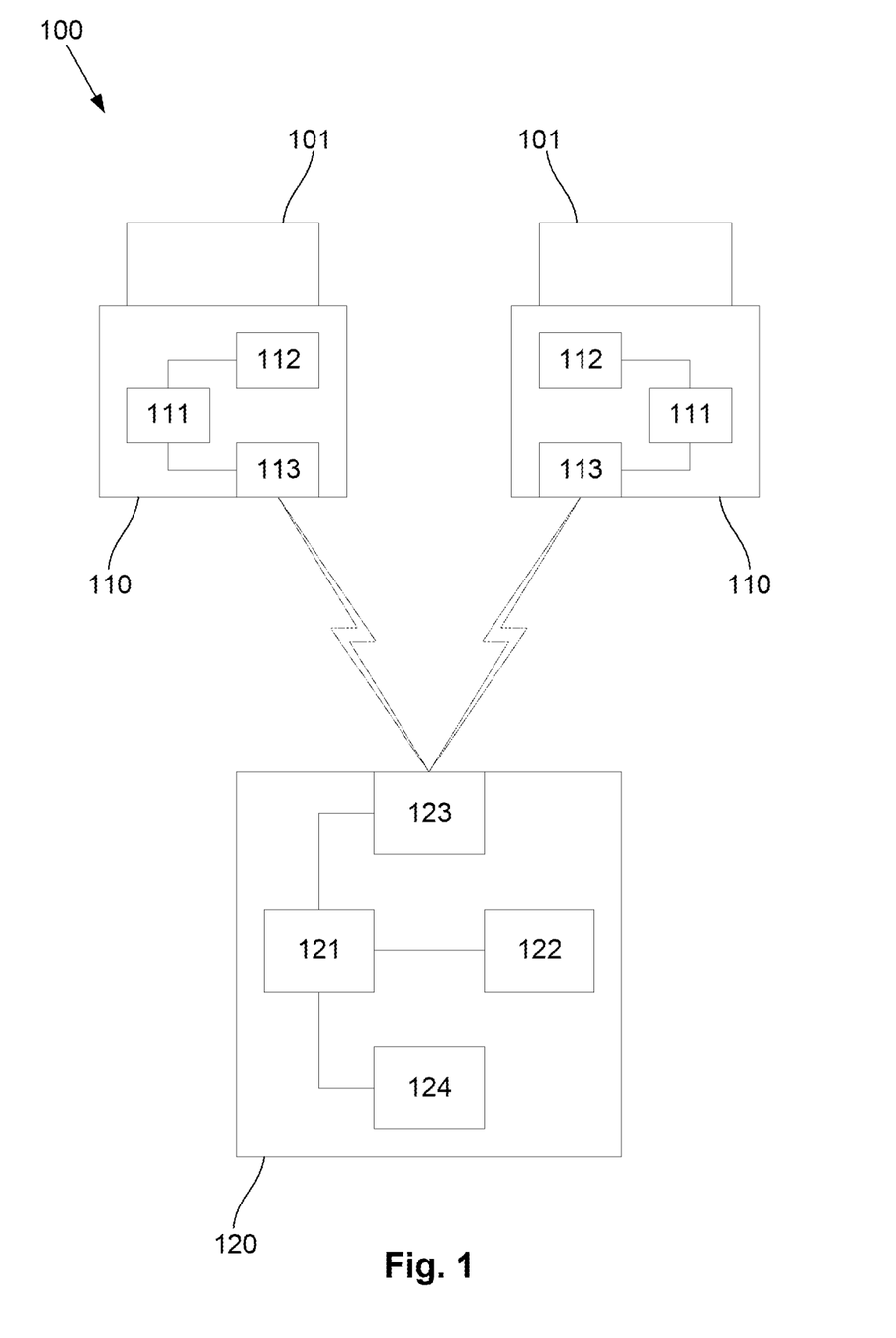
FIG. 1 is a schematic diagram of an example of an object recognition system.
Figure 2:
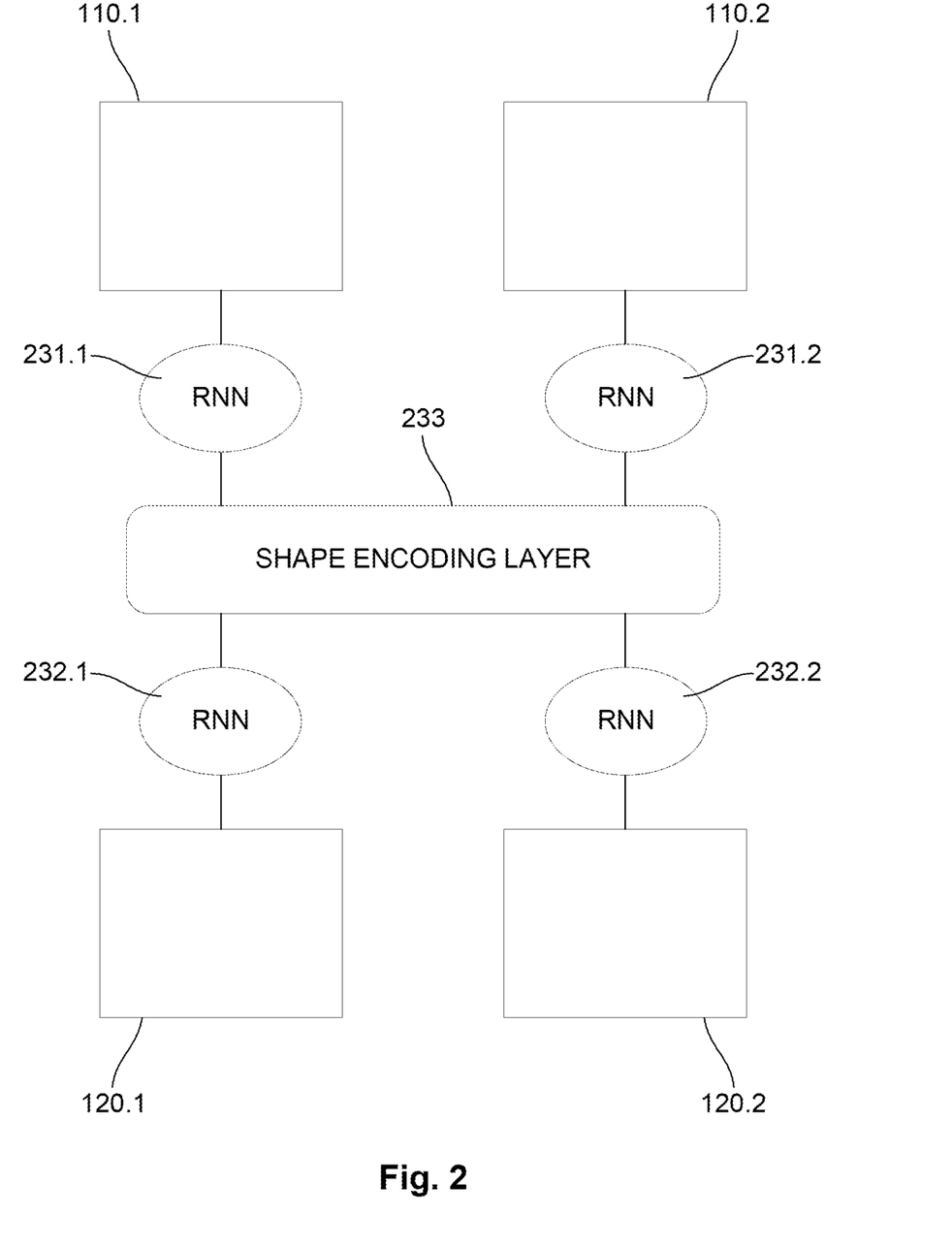
FIG. 2 is a schematic diagram of an example of model structure of the object recognition system of FIG. 1.

An example of an object recognition system will now be described with reference to FIGS. 1 and 2.

In this example, the system includes one or more tags 110, each of which is associated with a respective object 101 in use. The tags 110 are electronic tags 110 that are typically capable of communicating utilising a short range wireless communication protocol such as Bluetooth, Bluetooth Low Energy (BLE), Wi-Fi, or the like. The tags 110 are typically associated with an object 101 by having the tag 110 attached to or integrated into the object 101 in some manner, depending on the physical form factor of the tag 110 and the object. This is performed so that the tag 110 is generally provided in the same environment as the object, although this is not essential and other arrangements could be used, such as simply placing the tags in an environment that contains the objects.

Whilst the tags can have any form, typically the tags include components, such as a tag memory 112 configured to store an object model, a tag transceiver 113 to allow for wireless communication, for example to transmit or receive messages and a tag processing device 111 configured to perform any required operations. The components could be of any appropriate form, and could include volatile and/or non-volatile memory and a short range wireless transceiver, such as a Bluetooth transceiver, which optionally can be formed from a custom integrated circuit, such as a Bluetooth system on a chip (SOC), coupled to, or including an integrated antenna and other optional components. The tag processing device could be any electronic processing device such as a microprocessor, microchip processor, logic gate configuration, firmware optionally associated with implementing logic such as an FPGA (Field Programmable Gate Array), or any other electronic device, system or arrangement. For ease of illustration the remaining description will refer to a processing device, but it will be appreciated that multiple processing devices could be used, with processing distributed between the processing devices as needed, and that reference to the singular encompasses the plural arrangement and vice versa.

One or more sensing systems 120 are provided that communicate with the tags 110, either directly using a short range wireless communication protocol, or via intermediate networks or devices (not shown), such as wireless communications networks, or the like. The sensing system 120 typically includes a sensing device 124 configured to sense the environment. The nature of the sensing device and the manner in which it operates will vary depending on the intended application, and could include an imaging device, such as a camera, or a depth or range sensing arrangement, such as a lidar, radar, acoustic depth mapping device, or similar. It will also be appreciated that whilst reference is made to a single sensing device, multiple sensing devices might be provided, for example as part of a multi-modal sensing arrangement.

The sensing system 120 also typically includes, a sensing system memory 122 configured to store a sensing device model, a sensing system transceiver 123 configured to communicate with the tags, for example using a short range wireless protocol, and one or more sensing system processing devices 121. The components could be of any appropriate form, and could include volatile and/or non-volatile memory and a short range wireless transceiver, such as a Bluetooth transceiver, which optionally can be formed from a custom integrated circuit, such as a Bluetooth system on a chip (SOC), coupled to, or including an integrated antenna and other optional components. The sensing system processing device could be any electronic processing device such as a microprocessor, microchip processor, logic gate configuration, firmware optionally associated with implementing logic such as an FPGA (Field Programmable Gate Array), or any other electronic device, system or arrangement. For ease of illustration the remaining description will refer to a processing device, but it will be appreciated that multiple processing devices could be used, with processing distributed between the processing devices as needed, and that reference to the singular encompasses the plural arrangement and vice versa.

It will be appreciated from the above that the sensing system 120 could be of any appropriate form and in one particular example could include one or more of processing systems, computer systems, smart phones, tablets, mobile computing devices, optionally coupled to, or with integrated, sensing devices. However, this is not essential, and it will be appreciated that the sensing systems could be distributed and include physically separate sensing devices and processing systems, for example including sensing devices in the environment and separate computing devices in communication with the sensing devices via wired or wireless communications networks, or similar. In one specific example, the sensing system is integrated into a robot or other autonomous, or semi-autonomous arrangement, and is used to assist the robot in recognising objects within an environment, allowing the robot to interact with the objects as needed.

In use, tags 110.1, 110.2 associated with different objects store object models 231.1, 231.2, which are computational models indicative of a relationship between the respective object and a shape encoding layer 233. Similarly, different sensing systems 120.1, 120.2 will store sensing device models 232.1, 232.2, which is a computational model indicative of a relationship between sensor data captured using the respective sensing device and the shape encoding layer 233. The nature of the computational models will vary depending on the preferred implementation, but typically the models are some form of neural network, as will be described in more detail below.

The shape encoding layer 233 typically defines a number of different shape parameters that can be used in identifying different objects. It will be appreciated that these parameters are derived during creation of the computational models and are typically progressively built-upon as more object models are generated for different objects. The parameters could be of any appropriate form, and are typically derived during the machine learning process used to generate the object and sensing device models. Thus, the parameters could include real work physical parameters, such as dimensions of the object, but could also include other parameters derived by the machine learning approach that are useful in distinguishing between objects. In practice, the sensing device model converts sensor data captured by the sensing device into values of the different shape parameters, for example by generating one or more feature vectors based on the sensor data. The sensing system processing device can then use the object models then being used to map the particular shape parameter values to different objects, for example by applying the feature vectors to the different object models to identify any matches.

Figure 3:
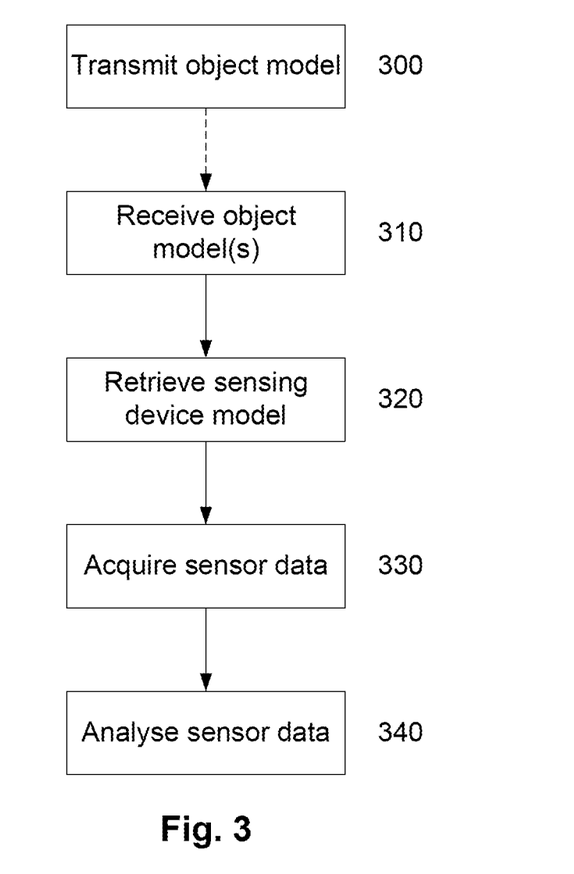
FIG. 3 is a flow chart of an example of an object recognition process.

In use, the object models are stored on the tags and transmitted to the sensing system, allowing the sensing system to use these in recognising objects, and an example of this process will now be described with reference to FIG. 3.

In this example, at step 300, a tag transmits a stored object model. This can be performed periodically, for example having a tag transmit the model periodically, say every few minutes using a broadcast or other similar message, so this could be received by any sensing systems within the vicinity of the tag. Alternatively, this could be performed in response to a request from the sensing system, in which case the model might be transmitted specifically to the sensing system making the request, or could be broadcast in a similar manner. In either case, as mentioned above, the object models are typically neural networks, meaning these typically have a size of the order of a few megabytes, making wireless transmission of the models feasible.

At step 310, the sensing system 120, and in particular the processing device 121, receives the object model, and retrieves the sensing device model from the internal memory 122 at step 320. At step 330, the processing device 121 acquires sensor data from the sensing device 124. The sensor data will typically be acquired by scanning the environment using the sensing device, and therefore typically capture details of one or more objects, as well as the surrounding environment.

It will be appreciated that these steps can be performed in any order, so for example, retrieval of the model could be performed prior to transmission and receipt of the object model, or the like.

Once the sensor data, object model and sensing device model have been acquired, the sensing system processing device uses the object and sensing device models and the sensor data to identify the objects at step 340. Thus, in one example, this involves applying the sensor data to the sensing device model to generate values of the shape encoding parameters, with these values then being applied to the object model to determine if the corresponding object has been captured within the sensor data. However, it will be appreciated that other suitable techniques could be used, depending on the nature of the models and the preferred implementation.

In any event, it will be appreciated that in practice, this allows a sensing system, which may for example be incorporated into a robot or similar, to receive object models from different types of objects that are within an environment. The sensing system can then be used to capture sensor data within that environment, and recognise those objects within the environment from the sensor data.

This approach leads to a number of significant benefits over traditional object recognition approaches. Firstly, the approach is using object specific models, so for example an object model of a cup is used to identify cups within the environment. As previously mentioned, such object specific models can be highly robust, leading to a very high level of object recognition accuracy.

Secondly, by virtue of the fact that the object models are transmitted by the tags, either periodically or on demand, this means the sensing system does not need access to object models of objects that are not present within the environment. This avoids the need for the sensing system to store or otherwise retrieve models that of objects that are not present within an environment, reducing storage and/or data transmission requirements.

Furthermore, this means the sensing system knows which object models are relevant to any given environment, meaning the sensor data need only be applied to models that are relevant. This avoids applying sensor data to models that are not relevant, reducing computational requirements, in turn allowing present objects to be identified more rapidly. This can also assist in increasing robustness of the recognition process, for example avoiding conflicting results that might arise if objects are very similar, as the sensing device processing device will only ever be using object models that are relevant to the objects within the environment.

Thirdly, the additional presence of a sensing device model means that object models can be trained using a different modality to that used in sensing. For example, object models to identify cups could be trained solely using optical images captured using an imaging device. Traditionally any such model would only then be useful for allowing cups to be recognised using optical sensing. However, in the above approach, the common shape encoding layer means sensor data can be mapped to the shape encoding layer and from there to the objects, so that a depth based sensor, such as a lidar or similar, could recognise a cup, even if the cup model had only been created using optical imaging as training data.

Accordingly, the above approach can be used to allow a sensing system, such as a robot, entering an environment, such as a room, to recognise and hence identify a range of different objects within an environment. This can be performed more rapidly and accurately than can be achieved using existing techniques, and more importantly can be sensor agnostic, as long as a sensing device model has been created.

A number of further features will now be described.

As previously mentioned, in one example, the environment includes a plurality of objects, each being associated with a respective tag. In this example, the processing device 121 is configured to recognise different ones of the plurality of objects. Thus, the sensing device could sense and recognise multiple objects using sensor data that captures all of the objects.

Each object model could be specific to a particular object and/or could be specific to a particular object type. For example, an object model could be derived that allows all cups to be identified as a cup, whilst alternatively models could be derived to distinguish between different cups, for example to identify specific types of cup, or even cups belonging to particular individuals. It will be appreciated that which approach is used will vary depending on the preferred implementation and that the approaches could be used in combination, for example allowing some individual objects to be identified, whereas other objects could be distinguished based on a type only.

Similarly, the sensing device model could be specific to a particular sensing device and/or specific to a particular sensing device type, and this may depend on variations arising between different sensing devices of the same type. For example, lidars might be manufactured to a high degree of consistency, so the model for one lidar is applicable to other lidars, whereas there might be a high degree of variability between different imaging devices, meaning models might need to be device specific.

In one example, the processing device is configured to use the sensor data and the sensing device model to generate shape encoding parameters and then use the shape encoding parameters and the object model to recognise an object. However, it will be appreciated that other approaches could be used. For example an output of a sensing device model could be applied as an input to an object model, regardless of the form of the output. Alternatively, a composite model could be generated and used to directly recognise objects within the sensor data.

As previously mentioned, the tag processing device can be configured to cause the tag transceiver to transmit the object model periodically and/or in response to a model request message received by the tag transceiver. This latter approach reduces transmission requirements, and therefore typically extends battery life, but it will be appreciated that the approach used will depend on the preferred implementation.

The sensing device could include an imaging device, a lidar, a radar and an acoustic mapping device.

The object model and/or sensing device models could be any one or more of neural networks, generative adversarial neural networks (GANs), and/or recursive neural networks, or the like.

Figure 4:
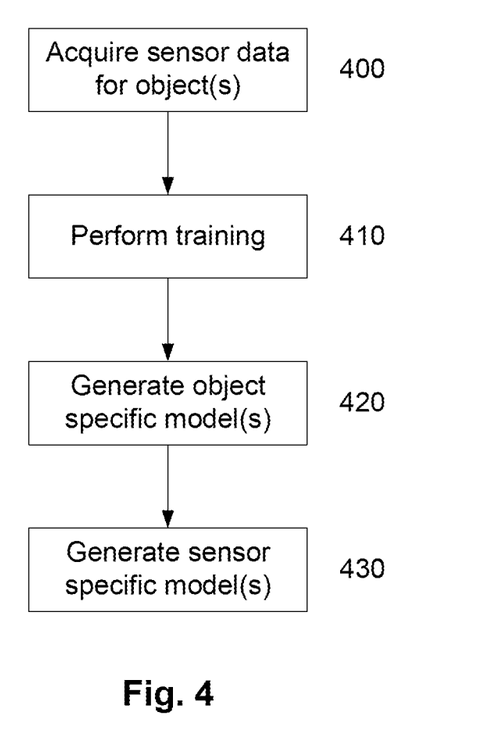
FIG. 4 is a schematic diagram of a specific example of a model training process.

In general, the networks are developed using machine learning approaches and an example of this will now be described with reference to FIG. 4.

At step 400, sensor data for one or more objects is captured at step 400. The sensor data is typically tagged with information identifying the respective objects, and optionally tailored or otherwise augmented, for example removing parts of the sensor data that do not contribute to object recognition. These processes could be performed using a manual process, or the like.

At step 410, the data is used to perform training, for example by using the data to train a GAN, which typically involves training a discriminator and generator of a GAN using the sensor data and identification of the objects. This is then used to generate an object specific model at step 420 and a sensing device specific model at step 430.

In this regard, it will be appreciated that it is possible to acquire sensor data indicative of a respective object within the environment from multiple different sensing devices and then use this to generate an object model, as well as multiple sensing device models. Similarly, multiple objects could be sensed using a single sensing device and used to generate a single sensing device model and multiple object models. The training of models in this manner is known in the art and will not therefore be described in any further detail.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. An object recognition system for recognising one or more objects within an environment, the system including:
   a) one or more tags, each tag being associated with a respective object in use, and each tag including:
      i) a tag memory configured to store an object model, the object model being a computational model indicative of a relationship between the respective object and a shape encoding layer;

ii) a tag transceiver; and, iii) a tag processing device configured to cause the tag transceiver to transmit the object model;

b) a sensing system including:

i) a sensing device configured to sense the environment;

ii) a sensing system memory configured to store a sensing device model, the sensing device model being a computational model indicative of a relationship between sensor data captured using the sensing device and the shape encoding layer;

iii) a sensing system transceiver;

iv) one or more sensing system processing devices configured to:

(1) receive one or more object models from the transceiver;

(2) retrieve the sensing device model from the sensing system memory;

(3) acquire sensor data indicative of the environment from the sensing device; and, (4) analyse the sensor data using the sensing device model and the one or more object models to thereby recognise the one or more objects within the environment.

2. A system according to claim 1, wherein the environment includes a plurality of objects, each being associated with a respective tag, and wherein the one or more processing devices are configured to recognise different ones of the plurality of objects.

3. A system according to claim 1, wherein each object model is one of:

a) specific to a particular object; and, b) specific to a particular object type.

4. A system according to claim 1, wherein the one or more processing devices are configured to:

a) use the sensor data and the sensing device model to generate shape encoding parameters; and, b) use the shape encoding parameters and the object model to recognise an object.

5. A system according to claim 1, wherein the tag processing device is configured to cause the tag transceiver to transmit the object model at least one of:

a) periodically; and, b) in response to a model request message received by the tag transceiver.

6. A system according to claim 1, wherein the sensing device model is one of:

a) specific to a particular sensing device; and, b) specific to a particular sensing device type.

7. A system according to claim 1, wherein the sensing device includes at least one of:

a) an imaging device;

b) a lidar;

c) a radar; and, d) an acoustic mapping device.

8. A system according to claim 1, wherein the object model is at least one of:

a) a generative adversarial neural network;

b) a neural network; and, c) a recursive neural network.

9. A system according to claim 1, wherein the sensing device model is at least one of:

a) a generative adversarial neural network;

b) a neural network; and, c) a recursive neural network.

10. An object recognition method for recognising one or more objects within an environment, the system including:

a) one or more tags, each tag being associated with a respective object in use, and each tag including:

i) a tag memory configured to store an object model, the object model being a computational model indicative of a relationship between the respective object and a shape encoding layer;

ii) a tag transceiver; and, iii) a tag processing device configured to cause the tag transceiver to transmit the object model;

b) a sensing system including:

i) a sensing device configured to sense the environment;

ii) a sensing system memory configured to store a sensing device model, the sensing device model being a computational model indicative of a relationship between sensor data captured using the sensing device and the shape encoding layer;

iii) a sensing system transceiver;

iv) one or more processing devices configured to:

(1) receive one or more object models from the transceiver;

(2) retrieve the sensing device model from the sensing system memory;

(3) acquire sensor data indicative of the environment from the sensing device; and, (4) analyse the sensor data using the sensing device model and the one or more object models to thereby recognise the one or more objects within the environment.

* * * * *